Jan. 20, 1959     D. L. SULLIVAN     2,869,638
AUTOMATIC FEEDER FOR VERTEBRATA
Filed April 2, 1956     3 Sheets-Sheet 1

INVENTOR.
Donald L. Sullivan,
BY Morsell & Morsell
ATTORNEYS.

Jan. 20, 1959  D. L. SULLIVAN  2,869,638
AUTOMATIC FEEDER FOR VERTEBRATA
Filed April 2, 1956  3 Sheets-Sheet 2

INVENTOR.
Donald L. Sullivan,
BY
Morsell & Morsell
ATTORNEYS.

Jan. 20, 1959

D. L. SULLIVAN 2,869,638

AUTOMATIC FEEDER FOR VERTEBRATA

Filed April 2, 1956

INVENTOR.
Donald L. Sullivan,
BY Morsell & Morsell
ATTORNEYS.

United States Patent Office 2,869,638
Patented Jan. 20, 1959

2,869,638

AUTOMATIC FEEDER FOR VERTEBRATA

Donald L. Sullivan, Oshkosh, Wis.

Application April 2, 1956, Serial No. 575,519

7 Claims. (Cl. 161—10)

This invention relates to improvements in automatic feeders for Vertebrata, and more particularly to a motor driven feeder for Vertebrata and the like which will operate automatically and discharged measured quantities of feed at timed intervals.

Although it is intended that the improved automatic feeder may be used generally in connection with timed automatic feeding of wild and domesticated animals, fish and fowl, it finds particular utility in connection with the feeding of fish being raised in hatcheries and the problems incident to the latter will be explained in connection with the present invention.

The conservation departments of many of the States of the United States operate fish hatcheries and there are also numerous privately operated fish hatcheries. At the present time the fish being raised in hatcheries are fed by hand and only at timed intervals during the regular working hours of the employees, although experience has shown that many advantages are gained by feeding the fish regularly throughout a twenty-four hour period.

With the foregoing in mind the present invention seeks to provide an automatic feeder for Vertebrata which can be operated efficiently at a low cost and which will supply to the fish or Vertebrata being raised correctly measured batches of food at predetermined timed intervals as long as the mechanism is in operation.

It is recognized that in the feeding of Vertebrata such as fish, the larger and more aggressive fish may under certain feeding conditions secure too much of the feed, to the detriment of the other fish, and a further object of the invention is to provide an automatic feeder which will discharge any desired quantity of feed at regular short periods of time and to disburse the food over a substantial area whereby all the fish will have opportunities to secure their share of the feed.

A further object of the invention is to provide an automatic feeder for Vertebrata which can be adjusted to operate on desired time cycles, which can handle dry pelletized food in specified sizes, and which is adjustable to regulate the amount of food delivered at each cycle, within certain limits.

A further object of the invention is to provide an automatic feeder of the class described having a hopper which will contain a large supply of feed from which smaller measured amounts are withdrawn for discharge at the feeding cycles, which eliminates undesirable trickling between cycles, and which can be operated on low wattage electricity.

A further object of the invention is to provide an automatic feeder of the class described which it suitable for year-round operation either indoors or out of doors, and which is safe and efficient in operation in that unauthorized tampering therewith or mechanism failures will not cause excessive batches of feed to be disbursed.

A further object of the invention is to provide an automatic feeder for Vertebrata which includes a rotatable bucket having a feed-receiving pocket of an adjustable capacity with means to control the flow of feed from an easily accessible hopper to the pocket, the bucket being slowly driven by clock mechanism from the discharging position to the filling station and then moving through a point of overbalance to permit gravity to carry it freely and quickly to the discharging position independently of the powered driving mechanism which, thereafter, operating at a slow and constant speed, picks up the bucket at the proper time interval and causes it to progress toward the loading station according to the time cycle.

A further object of the invention is to provide an automatic feeder for Vertebrata which is of very simple construction, which is strong and durable, which is adjustable, and which is well adapted for the purposes described.

With the above and other objects in view the invention consists of the improved automatic feeder for Vertebrata, and its parts and combinations as set forth in the claims, and all equivalents thereof.

In the accompanying drawings in which the same reference characters indicate the same parts in all of the views.

Figure 1:
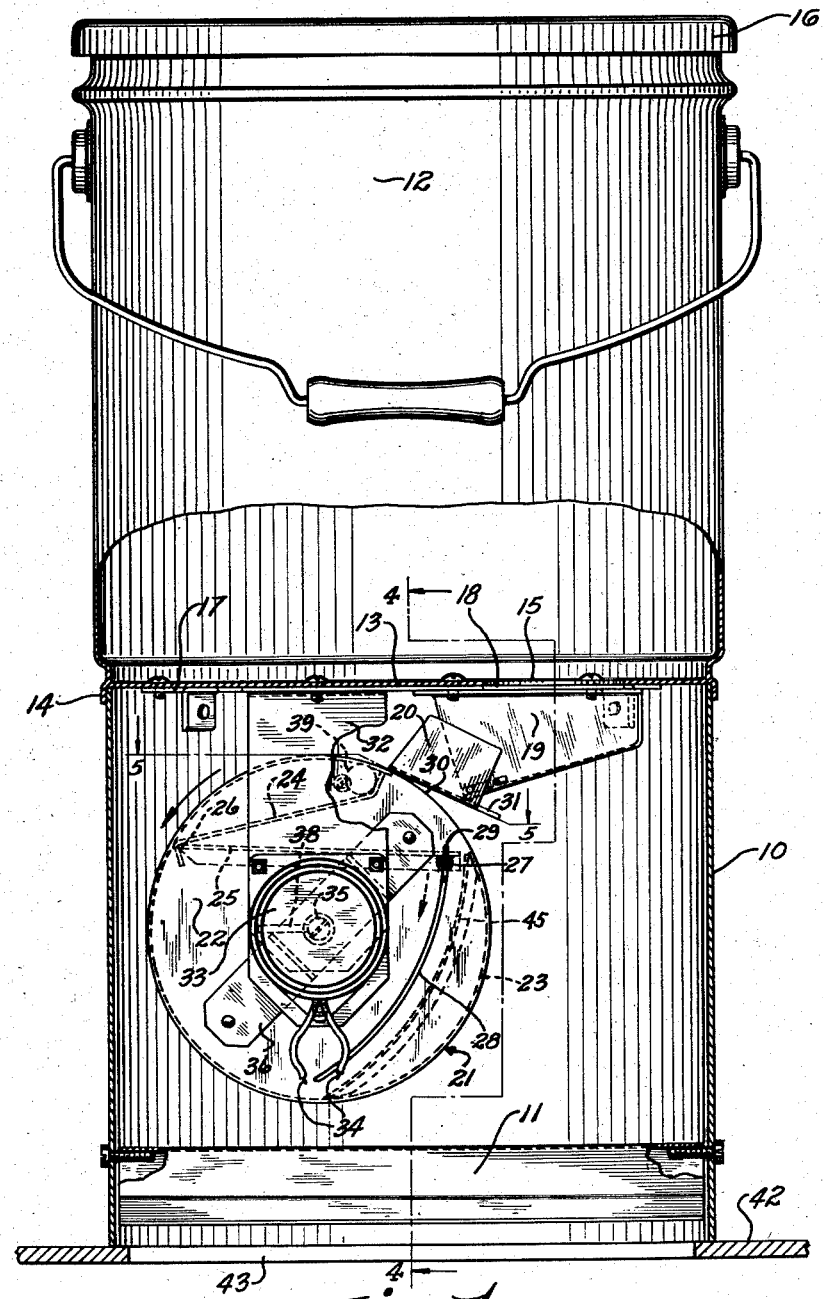
Fig. 1 is a side view of the improved automatic feeder for Vertebrata with parts being broken away and in section to show structural details.

Referring now more particularly to the drawings, it will appear that the automatic feeder for Vertebrata and the like includes a lower cylindrical housing 10 which is open at its lower end and has secured diametrically thereacross, an angled feed spreader 11. Adapted to be seated on the upper end of the cylindrical housing 10 is a hopper 12 which is in the form of a cylindrical pail having a bottom plate 13 which closes the upper end of the hopper 10. The lower peripheral portion of the hopper 12 is formed with a depending annular flange or collar 14 which has a force fit with the upper periphery of the housing 10. The bottom plate 13 of the hopper 12, offset from the center, is provided with a feed opening 15. The hopper is intended to hold an adequate supply of feed for the Vertebrata to be fed which may comprise several days' supply.

The supply of food, as for several days, is introduced into the hopper 12 through the upper end thereof which is normally closed by a removable cover 16. The feed varies with the particular type of Vertebrata to be fed but it may be a dry pelletized type of food. Bolted or otherwise secured to the undersurface of the bottom plate 13 of the hopper is a mounting plate 17 which has an opening 18 therein registering with the opening 15 in the bottom plate of the hopper 12. The mounting plate 17 forms a support for a downwardly inclined feed chute 19 which is depended from the mounting plate 17 below the registering openings 15 and 18 and which has its lower open end directed toward the mid portion of the interior of the housing 10. The lower open end of the food chute 19 is normally closed by a pivotally mounted gate or valve 20 which, when in the raised or closing position of Figs. 1 and 3, prevents a batch of feed from flowing out of the open end of the feed chute. The mass of feed within the hopper 10 through pressure and gravitation maintains a batch of feed in the chute 19 which is open to the hopper by virtue of the registering plate openings 15 and 18.

A rotary bucket is indicated generally by the numeral 21 and essentially the same comprises a pair of spaced apart discs 22 having inturned flanges 23. Secured between the bucket discs 22 is a spacing plate 24 in chordlike relation to the bucket discs 22 and forming a fixed wall of an adjustable feed pocket within the bucket 21. The other wall of the adjustable feed pocket is formed by an adjustable shelf 25 having one end pivotally secured within a flanged end of the pocket wall 24, as at 26, and having its other end provided with a laterally projecting stud 27 which shiftably engages an arcuate slot 28 in one of the bucket discs 22. The outer threaded end portion of the stud 27 carries a winged securing nut 29. Obviously, when the nut 29 is loosened, the adjustable shelf 25 of the feed pocket may be swung angularly relative to the fixed wall plate 24 of the feed pocket by sliding the stud 27 in the disc slot 28 to thereby increase or decrease the capacity of the feed pocket formed between the plates 24 and 25. When the wing nut 29 is tightened on its stud, the adjustable shelf 25 of the feed pocket is secured in a desired position. Obviously, the feed pocket, as will be seen from the drawings, is angular in longitudinal section. Outwardly of and concentric with the slot 28 is a flanged plate 45 which, when the shelf 25 is spread relative to the plate 24, forms part of the pocket.

The inturned flanges 23 on the discs 22 forming the feed bucket 21 are continuous except for a gap 30 adjacent the open mouth of the feed pocket. Consequently, the bottom of the feed chute gate or valve 20 will, except at the gap 30, ride on the disc flanges 23 whereby the valve 20 will be held in its raised chute closing position of Fig. 3, the transverse dimension of the valve or gate 20 being slightly less than the over-all transverse dimension of the bucket 21. The rotary bucket 21 is adapted to be driven in the direction of the arrow in Figs. 1, 2 and 3, by means later to be described, and when the rotary movement of the bucket brings the gap 30 of the disc flanges 23 beyond the forward end of the chute gate 20, support for the gate is eliminated and it drops or gravitates to the position of Fig. 2 through the gap 30 so as to register with the open end of the feed pocket between the plates 24, 45, and 25, whereby a desired quantity of feed is permitted to gravitate from the chute 19 into the feed pocket of the rotary bucket. At this stage, the bottom of the gate is in substantial alinement with the inclined bottom of the trough 19 and an extension 31 on the bottom of the gate engages the forward bottom portion of the trough 19 to limit the downward swinging movement of the gate. Upon continued rotary movement of the bucket 21 in the direction of the arrow, after a charge from the chute 19 has been introduced into the adjustable feed pocket, the flanges 23 of the discs 22, beyond the gap 30, will then engage the bottom of the gate 20 and raise the same to the position of Fig. 3 to hold the lower end of the feed chute 19 closed against discharge until the feed bucket is in position in the next cycle.

Figure 2:
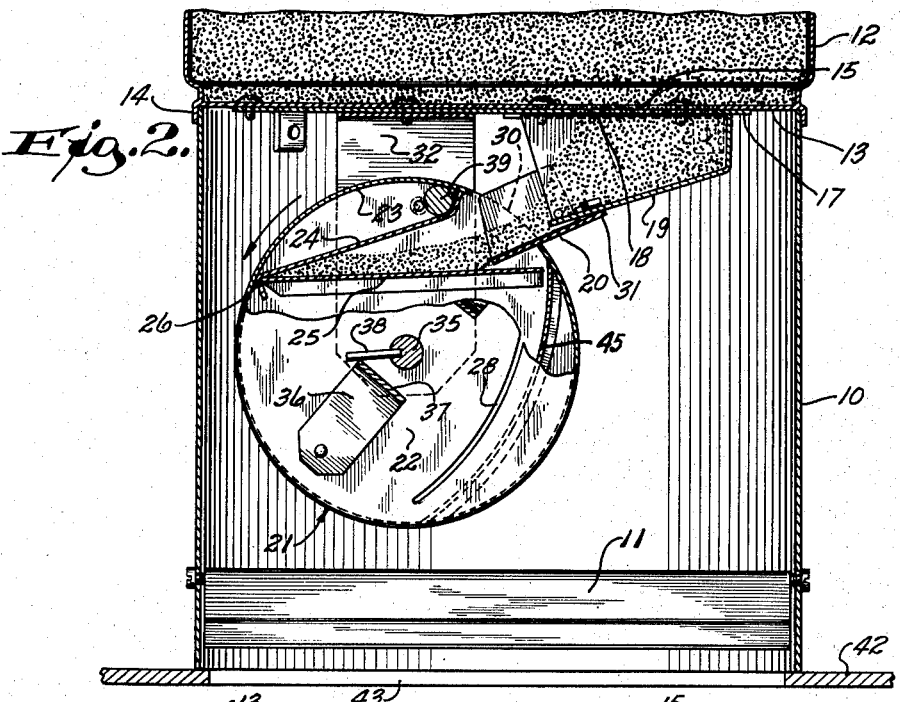
Fig. 2 is a fragmentary sectional view of the lower portion of the assemblage showing the rotatable feed-receiving bucket in loading position.
Figure 3:
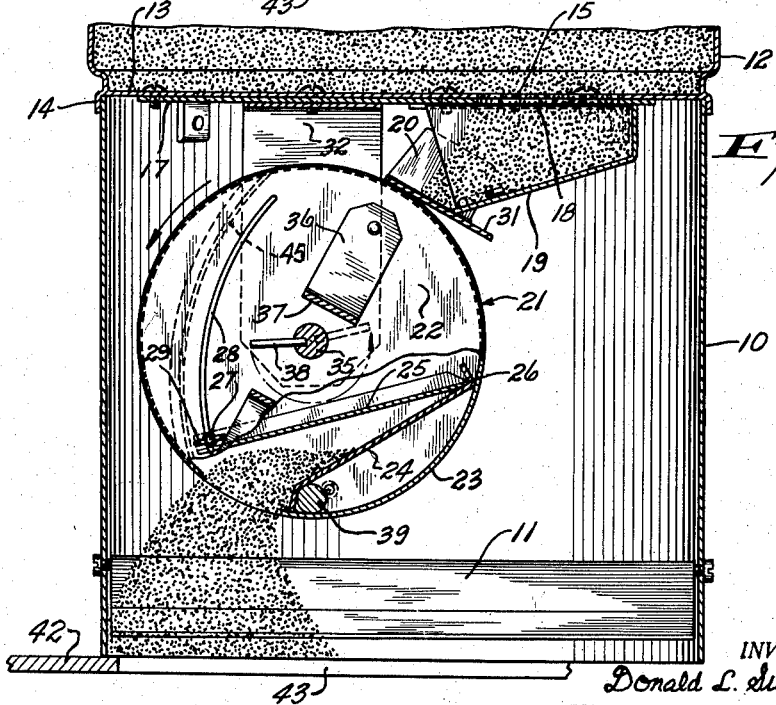
Fig. 3 is a similar fragmentary sectional view only showing the bucket in its timed feed batch discharging position.
Figure 4:
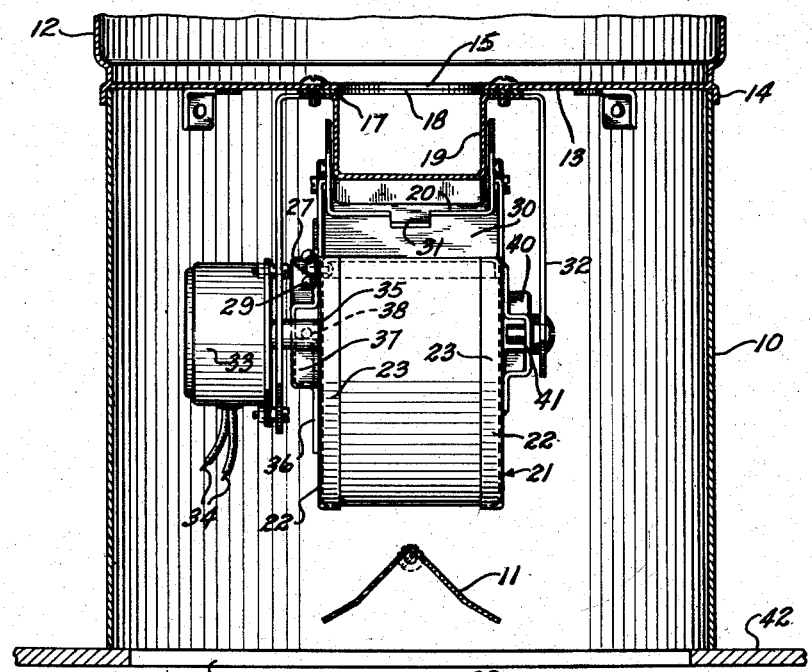
Fig. 4 is a fragmentary vertical sectional view taken approximately along the line 4—4 of Fig. 1.
Figure 5:
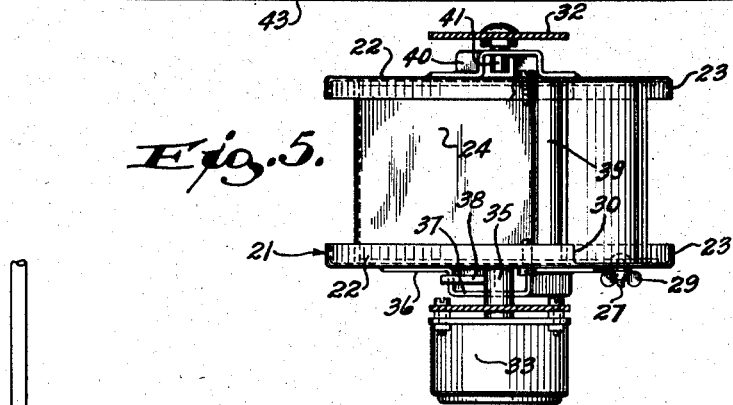
Fig. 5 is a fragmentary detail sectional view taken along the line 5—5 of Fig. 1.

The mounting plate 17 also has secured thereto transversely the upper end of a stirrup or inverted U-shaped bracket 32. Mounted on the outer face of one of the down-turned legs or sides of the stirrup 32 is a conventional induction motor and driven clock mechanism 33 supplied with electricity through circuit wires 34 and having its clock work driven shaft 35 alined with the centers of the bucket discs 22. The bucket disc 22 immediately adjacent the clock and motor assemblage 33 carries on its outer face a bracket 36 having an outwardly offset mid-portion 37 which is eccentric relative to the axis of the clock driven shaft 35 which extends freely revolubly into an opening therefor in the offset portion 37 of the bracket 36. Extending radially from the portion of the shaft 35 within the bracket portion 37 is a pin 38 and due to the spacing of the end walls of the bracket portion 37 relative to the axis of the shaft 35, during turning of the shaft 35 the pin 38 will, at a certain stage, engage the close end wall of the bracket portion 37 as is shown in Fig. 2, and through this engagement impart turning motion to the bucket. However, at another stage the weighted bucket may move by gravity rapidly away from the slowly turning shaft 35 and pin 38. The other more distant end wall of the bracket portion 37 permits clearance between it and the pin 38. Consequently, the over-weighted condition of the bucket 23 will cause it to advance rapidly from the position of Fig. 2 to the batch disbursing position of Fig. 3, this movement of the bucket being free of any drive from the shaft 35 and pin 38. The overbalanced condition of the bucket to provide the rapid gravitation from the position of Fig. 2 to the position of Fig. 3 is occasioned by a transverse weighted bar 39 mounted adjacent the open end of the pocket plus the weight of the food batch in the pocket. Obviously, this quick arcuate advance of the bucket takes place while the clock operated shaft 35 is turning at its normal slow rate of movement so that the bucket will remain in the feed batch disbursing position of Fig. 3 until the proper time interval has elapsed and the shaft 35 and pin 38 are turned into engagement with the close shoulder of the bracket portion 37 to once again provide driving engagement as between the shaft carried pin and the rotary bucket. This positive driven engagement continues until the open end of the pocket with the gap portion 30 is positively driven beyond the loading station condition of Fig. 2.

The other disc 22 of the rotary bucket 21 has affixed centrally thereto an outwardly offset bracket 40 having an aperture therein and forming a bearing for a pin or stud 41 extending inwardly from the other depending leg portion of the stirrup or bracket 32.

The adjustable shelf 25 of the bucket pocket is shown in the drawing in its most restricted position to provide a feed batch pocket of smallest capacity. However, by spreading this shelf relative to the fixed plate 24 of the pocket, the capacity of the pocket may be readily varied. Merely by way of example for the feeding of fish, it is intended that the motor driven clock work mechanism 33 be such as to provide one complete revolution of the driven shaft 35 and hence the rotary bucket 23 in every two hour period, although the mechanism could be varied for any desired timing period or cycle. When the bucket is positively driven by the motor clock mechanism slightly beyond the position of Fig. 1 into the position of Fig. 2, the dropping of the chute gate 20 permits feed to flow down the chute 19 and gate into the pocket of the rotary bucket until the bucket is filled and the further flow of feed is blocked, no further feed being then acceptable by the pocket since the walls of the pocket intersect the flow line of feed. Because of the slow turning movement of the driven shaft 35 with the pin 38 drivingly engaging a portion of the bracket 37, the bucket will be slowly advanced in the direction of the arrow in Fig. 2 away from the loading position until the camming action of the disc flanges 23 beyond the gap 30 raises the gate valve 20 to its chute closing position. Thereafter, due to the overbalanced condition of the bucket, as previously described, it will gravitate rapidly to the feed batch disbursing position of Fig. 3 and will so remain until the continued slow movement of the shaft 35 causes the pin 38 to drivingly engage the close wall of the bracket 37 to thereafter continue the slow driven movement of the bucket from the disbursing position to the load receiving position for the next cycle and within the prescribed time period.

The rapid pendulum like gravitating swing of the bucket from the position of Fig. 2 to the position of Fig. 3 is important in that it helps to disburse the feed batch over a relatively wide area and the discharge feed may strike the angled spreader 11 which further aids in wide distribution. The lower open end of the cylindrical housing 10 may be supported in or over the Vertebrata feeding station by a suitably mounted flat base member 42 having an opening 43 therein registering with the open end of the housing 10.

The weight of the rotary bucket plus the weight of the food in the bucket pocket may have a relatively high kinetic energy of motion. Nevertheless, not any of this energy is transmitted to the drive shaft 35 and thence to the light gear mechanism of the motor and clock work so as to strain or damage the same. The housing 10 enclosing the bucket, chute and associated mechanism is optional, but is advantageous in that it protects the mechanism from weather and tampering and also provides a support for the spreader 11.

Figure 6:
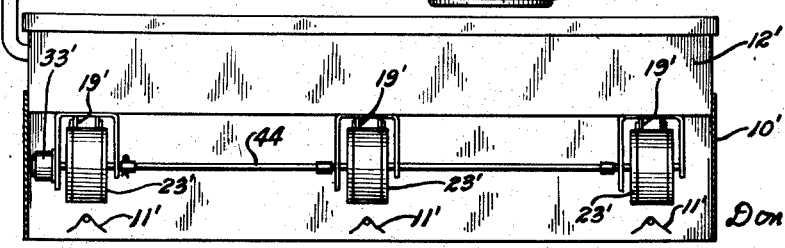
Fig. 6 is an enlarged fragmentary view partly in section to illustrate a modified form of the invention including a gang of jointly operating feeders.

The single bucket unit shown in Figs. 1, 2 and 3 obviously has a limited feed batch spill or disbursing range. In many fish rearing ponds or for other feeding operations it may be desirable to scatter the feed throughout a considerably wider area. In Fig. 6 there is a fragmentary showing of a multiple unit apparatus for this purpose. The numeral 12' in Fig. 6 indicates the hopper and therebelow is a cylindrical housing 10' having mounted therewithin a plurality of spaced apart feeding buckets 23', all similar to the bucket 23 described in detail in connection with the principal form of the invention. Each of the buckets 23' is adapted to have the pocket therein supplied with batches of feed from the common hopper 12' by individual gate controlled chutes 19'. All of the buckets 23' are mounted on a common shaft 44 but only one of the buckets, as that adjacent the lefthand side of the showing in Fig. 6, is positively driven by the timer motor 33'. Through the shaft 44 which is turned by the driven bucket 19' the other buckets will be moved simultaneously so as to receive their feed batches and discharge the same simultaneously.

The improved automatic feeder for Vertebrata is believed to be susceptible of proper automatic operation over a long period of time so as to deliver at uniformly timed intervals desired batches of feed. The continuously operating electric motor, which is connected with the source of electrical supply by means of the circuit wires 34, keeps warm in winter and in the summer time the heat generated by the motor will counteract high humidity. The motor is small and economical, consuming only a small amount of watts. Various portions of the assemblage may be made of sheet metal whereby the feeder may be produced at a low cost. The device is furthermore of such a nature that the discharge of excessive quantities of feed due to power or mechanical failures or tampering is practically impossible but all portions of the feeder are accessible for cleaning, repairs, inspection and maintenance. Also, the hopper may be readily loaded with large supplies of feed and as thus charged or loaded, the device can operate without attention for an indefinite period of time but will effectively disburse to Vertebrata which are to be fed suitable measured quantities of feed at regular time intervals.

The improved automatic feeder for Vertebrata and the like is of simple and novel construction and is well adapted for the purposes described.

What is claimed as the invention is:

1. An automatic batch feeding device for Vertebrata and the like, comprising a feed hopper, a rotary bucket mounted therebelow on a horizontal axis and formed with a feed batch-receiving pocket opening through a peripheral portion of the bucket, a feed batch chute depending from the hopper to register with the pocket of the rotary bucket when the latter is positioned with the pocket opening adjacent the top of the circular path of travel of the bucket, a gate pivotally connected with the chute and operated by movement of the bucket to control the flow of feed from the chute into the bucket pocket, said gate being movable from a chute opening position to a chute closing position, the contents of the bucket pocket being discharged and disbursed when the bucket is turned toward a reverse position to direct the pocket opening downwardly, and clock mechanism releasably engageable with the bucket to turn it one revolution in a predetermined time period, said mechanism being temporarily disengageable from the bucket following loading of the pocket whereby gravity will cause rapid movement of the bucket to its pocket discharging position where it remains until it is subsequently engaged by the clock mechanism for positive rotation to the pocket loading position.

2. An automatic batch feeding device for Vertebrata and the like, comprising a feed hopper, a rotary bucket mounted therebelow on a horizontal axis and formed with a feed batch-receiving pocket opening through a peripheral portion of the bucket, a feed batch chute depending from the hopper to register with the pocket of the rotary bucket when the latter is positioned with the pocket opening adjacent the top of the circular path of travel of the bucket, a gate hingedly carried by the chute, a cam formed on the bucket and engaging the gate when the bucket rotates beyond a certain position to hold the gate in chute closing position, the cam being disengaged from the gate when the bucket pocket is in registry with the chute, the contents of the bucket pocket being discharged and disbursed when the bucket is turned toward a reverse position to direct the pocket opening downwardly, and clock mechanism releasably engageable with the bucket to turn it one revolution in a predetermined time period, said mechanism being temporarily disengageable from the bucket following loading of the pocket whereby gravity will cause rapid movement of the bucket to its pocket discharging position where it remains until it is subsequently engaged by the clock mechanism for positive rotation to the pocket loading position.

3. In combination, a hopper for Vertebrata feed and having a lower discharge opening, a bucket revoluble on a horizontal axis and formed with a single outwardly opening feed batch-receiving pocket, a trough interposed between the hopper opening and the upper end of the bucket, a gate pivotally depended from the trough and engaged by the bucket and operated thereby, clock mechanism for moving the bucket between a lower feed batch-discharging position with the pocket opening downwardly and an upper feed batch-receiving position with the pocket opening upwardly in registry with the trough and gate, the movement of the bucket to the latter position moving the trough gate to open position to fill the pocket from the hopper, and a lug formed on the bucket, the clock mechanism having a finger turned in a circular path to engage the bucket lug and push the bucket in a circular path, the bucket when advanced beyond its batch-receiving position, moving rapidly by gravity free of the clock mechanism finger to its lower batch-discharging position.

4. An automatic batch feeding device for Vertebrata and the like, comprising a feed hopper, a rotary bucket mounted therebelow on a horizontal axis and formed with a variable capacity, feed batch-receiving pocket opening through a peripheral portion of the bucket, a feed batch chute depending from the hopper to register with the pocket of the rotary bucket when the latter is positioned with the pocket opening adjacent the top of the circular path of travel of the bucket, a gate hingedly depended from the chute, a cam formed on the bucket and directly engaging the gate to hold it in chute closing position except when the bucket pocket is in registry with the chute, the contents of the bucket pocket being discharged and disbursed when the bucket is turned toward a reverse position to direct the pocket opening downwardly, and motor driven clock mechanism having an element to engage and push the bucket from its pocket discharging position to its pocket filling position, the bucket following loading of the pocket, being rapidly moved by gravity.

5. In combination, a hopper for Vertebrata feed and having a lower discharge opening, a pair of bucket-forming discs revoluble on a horizontal axis, an outwardly opening, adjustable feed batch-receiving pocket between said discs, the periphery of a disc being formed with a cam surface, a trough interposed between the hopper opening and the upper end of the bucket to register with the feed pocket in one position of the discs, a gate controlling discharge from the trough pivotally carried by the trough and riding on the disc cam surface, the engagement between said gate and cam surface being such that the gate closes the discharge end of the trough except when the trough is in registry with the pocket, clock mechanism for slowly moving the bucket between a lower feed batch-discharging position with the pocket opening downwardly and an upper feed batch-receiving position with the pocket opening upwardly in registry with the trough, and a lug formed on a bucket disc, the clock mechanism having a finger turned in a circular path to engage the lug and push the bucket in a circular path, the bucket when advanced beyond its batch-receiving position, moving rapidly by gravity free of the clock mechanism finger to its lower batch-discharging position.

6. In combination, a hopper for Vertebrata feed and having a lower discharge opening, a pair of bucket-forming discs revoluble on a horizontal axis, an outwardly opening feed batch-receiving pocket between said discs, the periphery of a disc being formed with a cam surface, a trough interposed between the hopper opening and the upper end of the bucket to register with the feed pocket in one position of the discs, a gate controlling discharge from the trough pivotally carried by the trough and riding on the disc cam surface, the engagement between said gate and cam surface being such that the gate closes the discharge end of the trough except when the trough is in registry with the pocket, and mechanism for slowly mechanically moving the bucket only between a lower feed batch-discharging position with the pocket opening downwardly and an upper feed-receiving position with the pocket opening upwardly in registry with the trough, said mechanism being disconnected at the last-mentioned position whereby gravity will cause rapid movement of the bucket from said last-mentioned position to the feed batch-discharging position.

7. An automatic batch feeding device for Vertebrata and the like, comprising a feed hopper having a discharge, a rotary bucket mounted therebelow, on a horizontal axis and formed with a feed batch receiving pocket to register with the hopper discharge when the bucket is turned to position its pocket uppermost during the circular path of travel of the bucket, the contents of the bucket being discharged and disbursed when the bucket is turned to a reverse position to direct the pocket opening downwardly, and clock mechanism releasably engageable with the bucket to turn it one revolution in a predetermined time period, said mechanism being temporarily disengageable from the bucket following loading of the pocket whereby gravity will cause rapid movement of the bucket to its pocket discharging position where it remains until it is subsequently engaged by the clock mechanism for positive rotation to the pocket loading position.

References Cited in the file of this patent

UNITED STATES PATENTS

| | | |
|---|---|---|
| 735,167 | Steinberg | Feb. 19, 1903 |
| 742,969 | Clapp | Nov. 3, 1903 |
| 1,025,723 | Shafer | May 7, 1912 |
| 1,143,634 | Lane et al. | June 22, 1915 |
| 1,214,881 | Berntzen | Feb. 6, 1917 |
| 2,353,481 | McCormick | July 11, 1944 |
| 2,538,413 | Chard | Jan. 16, 1951 |
| 2,700,489 | Sheft | Jan. 25, 1955 |
| 2,793,791 | Clark | May 28, 1957 |